June 21, 1932.  J. J. PUNKE  1,864,372
BODY APRON
Filed Feb. 4, 1929  2 Sheets-Sheet 1
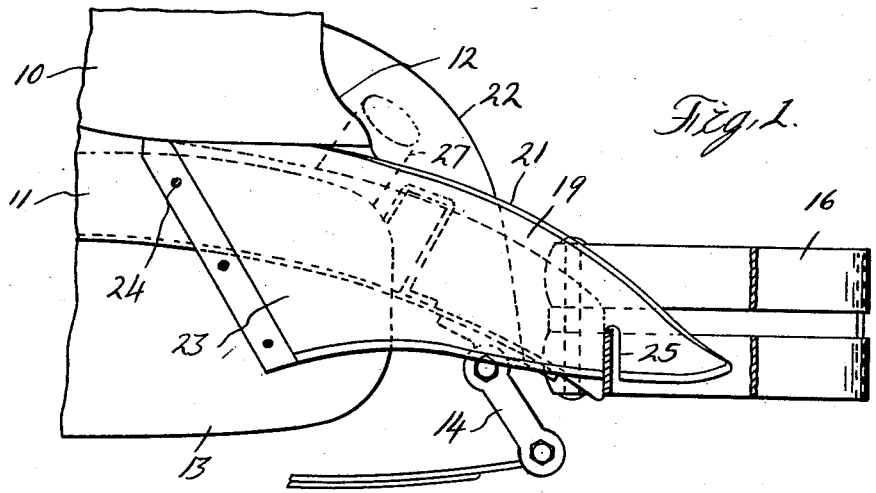
Fig. 1.
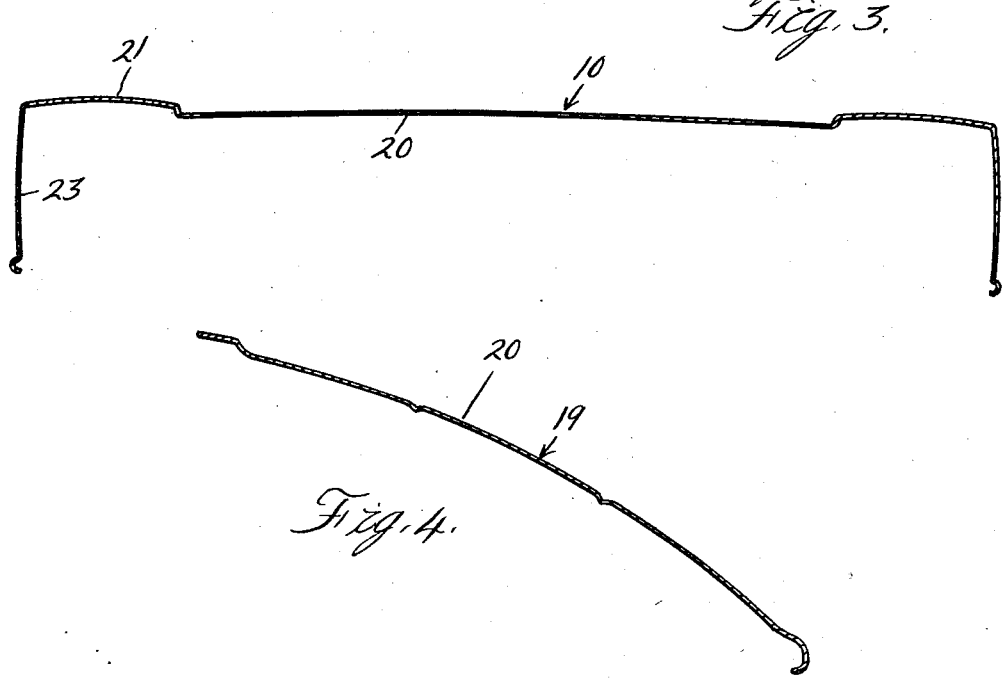
Fig. 3.
Fig. 4.
INVENTOR
John J. Punke
BY
ATTORNEYS

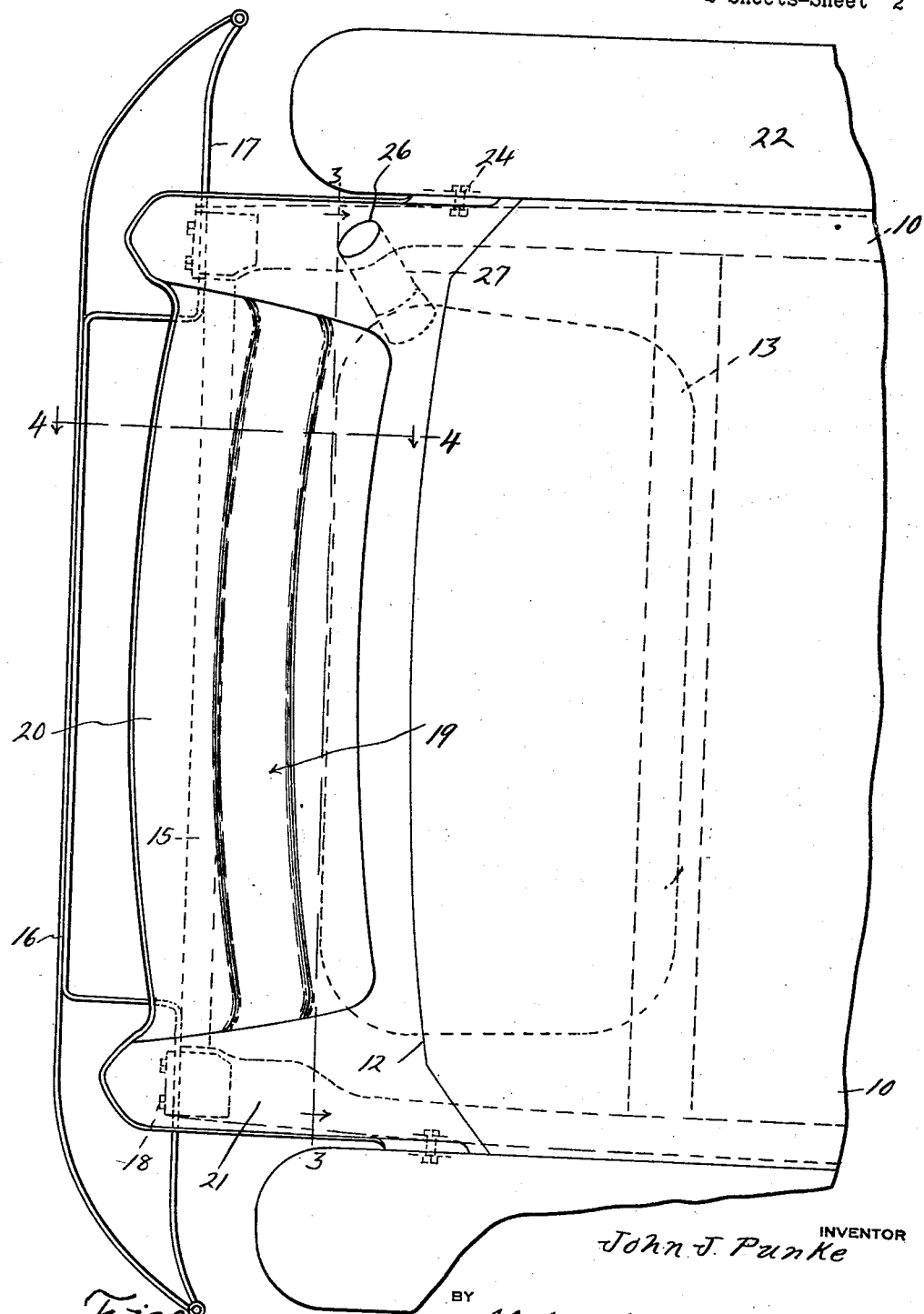

Patented June 21, 1932

1,864,372

UNITED STATES PATENT OFFICE

JOHN J. PUNKE, OF DETROIT, MICHIGAN, ASSIGNOR TO HUPP MOTOR CAR CORPORATION, OF DETROIT, MICHIGAN, A CORPORATION OF VIRGINIA

BODY APRON

Application filed February 4, 1929. Serial No. 337,501.

This invention relates generally to motor vehicles and has particular reference to means for enhancing the general appearance of the vehicle by concealing certain exposed portions of the running gear thereof.

One of the primary objects of this invention is to provide an apron like member forming in effect, a continuation of the rear body panel and adapted to slope downwardly and rearwardly therefrom so as to completely conceal the fuel tank of the vehicle.

Another object of the invention is to provide an apron of the above type having raised side portions simulating the contour of the rear fenders of the vehicle and located directly above the rear chassis frame sill horns, thereby completely concealing the latter.

A further advantageous feature of the present invention resides in the provision of an apron which in addition to concealing the fuel tank and sill horns aforesaid, completely conceals the mounting for the rear bumper.

Other objects and novel details of construction of this invention will be made more apparent as this description proceeds, especially when considered in connection with the accompanying drawings wherein:

Figure 1 is a fragmentary side elevational view of a vehicle having an apron constructed in accordance with this invention applied thereto;

Figure 2 is a plan view of the apron shown in Figure 1;

Figure 3 is a sectional view taken on the line 3—3 of Figure 2; and

Figure 4 is a section view taken on the line 4—4 of Figure 2.

Referring now to the drawings it will be noted that there is illustrated fragmentarily, a vehicle 10 having a chassis frame 11 and body 12 supported upon the frame 11 in any suitable manner. As shown in Figure 1 of the drawings the running gear of the vehicle is of conventional design in that the sill members of the frame 11 project rearwardly from the end of the body and support the fuel tank 13 and spring shackles 14. The rear ends of the sill members are connected by a suitable cross bar 15 which, as illustrated in Figure 2, forms a mounting for the rear bumper 16; the latter having attaching bars 17 secured to the bar 15 in alignment with the sill members by means of the bolts 18.

The apron forming the subject matter of this invention comprises a member 19 preferably, although not necessarily, formed of sheet metal and having an intermediate portion 20 extending substantially the full width of the rear end of the body and designed to slope downwardly and rearwardly therefrom at a point spaced rearwardly from the ends of the sill members, thereby completely covering the rear end portions of the frame together with the fuel tank and connection between the bumper attaching bars 17 and cross bar 15. As shown particularly in Figure 1, the apron forms in effect, a continuation of the body and gives the same a longer appearance which, together with the concealing function thereof hereinbefore set forth, enhances the general appearance of the vehicle.

To further enhance the appearance of the vehicle the side portions of the apron 19 directly above the sill members, are raised or crowned as indicated at 21 so as to simulate in appearance, the rear fenders 22 of the vehicle. The raised portions 21 terminate in depending flanges 23 which extend forwardly along the sides of the body to points adjacent the rear fenders and are secured to the body by the fender securing bolts 24. The flanges 23 project downwardly a sufficient distance to fully conceal the sides of the projecting ends of the sill members and are provided with aligned slots 25 for receiving the bumper attaching bars 17. The apron 19 is also provided with a suitable aperture 26 through which the filler neck 27 for the fuel tank 13 extends.

Thus from the foregoing it will be apparent that I have provided a rear body apron which in addition to thoroughly concealing the fuel tank, exposed rearwardly projecting portions of the frame and rear bumper mounting, forms in effect, a continuation of the rear body panel and as a consequence improves the general appearance of the vehicle.

What I claim as my invention is:

1. In a vehicle, the combination with a body and a frame therefor having portions projecting rearwardly from the body, of means for concealing the exposed portions of the frame, said means including an apron forming in effect a continuation of the body and having an intermediate portion sloping downwardly and rearwardly from the rear end of the body, said apron further having forwardly projecting side portions depending from the sides of the body exteriorly of the frame.

2. In a vehicle, the combination with a body, a frame for said body having end portions projecting rearwardly from said body and a fuel tank carried by the frame adjacent the rear end of the body, of an apron extending substantially the full width of the body and extending rearwardly therefrom, said apron having an intermediate portion concealing said fuel tank and having raised side portions concealing the exposed portions of the frame.

3. A vehicle having in combination, a body, a frame for said body having portions projecting rearwardly from the body, a bumper having an attaching bar mounted upon the rear ends of the projecting portions aforesaid of the frame, and an apron forming in effect a continuation of the rear end of the body and sloping downwardly and rearwardly therefrom completely concealing the projecting portions of the frame and also the mounting of the bumper attaching bar to the ends of the frame.

4. A vehicle having in combination, a body, a frame for the body including sill members having the end portions thereof projecting rearwardly from the body, a bumper for the vehicle having attaching bars mounted upon the rear ends of the sill members, and means completely concealing the projecting portions of the sill members and the mounting of the bumper attaching bars to the ends thereof, said means including an apron having an intermediate portion extending substantially the full width of the body and extending rearwardly therefrom and terminating at the sides thereof in depending flanges extending forwardly along opposite sides of the body exteriorly of the sill members and having slots therein adjacent the rear ends thereof for receiving the bumper attaching bars.

5. A vehicle having in combination, a body, a frame for said body having portions projecting rearwardly therefrom, a fuel tank supported by said frame adjacent the rear end of the body, a bumper attaching bar mounted upon the ends of the projecting portions of the frame, and an apron forming a continuation of the rear end of the body completely concealing the projecting portions of the frame, the fuel tank and the mounting of the attaching bar to the ends of the frame.

6. In a vehicle, the combination with a chassis frame and a bumper, of means for mounting the bumper adjacent one end of the frame, and an apron carried by the frame having a portion concealing the end aforesaid of the chassis frame and having another portion projecting rearwardly from the frame and concealing the bumper attaching means aforesaid.

7. In a vehicle, the combination with a body and a bumper in rear of the body, of a mounting for the bumper spaced rearwardly from the body, and an apron extending rearwardly from the body beyond the mounting aforesaid for the bumper and fashioned to conceal said mounting.

In testimony whereof, I affix my signature.

JOHN J. PUNKE.